US012664044B1

(12) United States Patent
Liao et al.

(10) Patent No.: US 12,664,044 B1
(45) Date of Patent: Jun. 23, 2026

(54) PRESERVING PATTERN CHECKING FOR DATA INTEGRITY ACROSS A SINGLE WIDER LINK AND MULTIPLE NARROWER LINKS

(71) Applicant: Marvell Asia Pte Ltd, Singapore (SG)

(72) Inventors: Zhiheng Liao, San Jose, CA (US); Jianghui Su, San Jose, CA (US); Xu Han, San Jose, CA (US); Mo Yang, San Jose, CA (US)

(73) Assignee: MARVELL ASIA PTE LTD, Singapore (SG)

( * ) Notice: Subject to any disclaimer, the term of this patent is extended or adjusted under 35 U.S.C. 154(b) by 0 days.

(21) Appl. No.: 18/754,399

(22) Filed: Jun. 26, 2024

Related U.S. Application Data

(60) Provisional application No. 63/534,106, filed on Aug. 22, 2023, provisional application No. 63/531,653, filed on Aug. 9, 2023, provisional application No. 63/529,123, filed on Jul. 26, 2023.

(51) Int. Cl.
 *G06F 11/10* (2006.01)
(52) U.S. Cl.
 CPC ................................ *G06F 11/1004* (2013.01)

(58) Field of Classification Search
 CPC .................................................. G06F 11/1004
 See application file for complete search history.

(56) References Cited

U.S. PATENT DOCUMENTS

| | | | |
|---|---|---|---|
| 2006/0251161 A1* | 11/2006 | Sidhu .................. | H04L 25/0262 375/222 |
| 2020/0313839 A1* | 10/2020 | Den Besten ...... | H04L 12/40156 |

\* cited by examiner

*Primary Examiner* — Thien Nguyen

(57) ABSTRACT

A method for checking integrity of data propagated, in either direction, between a first data link having a first data width and a first data speed, and a plurality of second data links each of which has a second data width narrower than the first width and a second data speed slower than the first speed, includes propagating data with a known pattern (a) from the first link to the plurality of second links, or (b) from the plurality of second links to the first link, selecting bits when transitioning (a) from the first link to each link in the plurality of second links, or (b) from each link in the plurality of second links to the first link, in a manner that preserves the known pattern, and checking for the known pattern when receiving the propagated data at (a) the plurality of second links, or (b) the first link.

22 Claims, 10 Drawing Sheets

400

401 — High-speed link is stable

402 — Propagate PRBS test pattern

403 — Run test pattern through pattern checker

404 — Configure decimator to drive CLK3 and distribute data

405 — $i=0$

406 — Enable $i$th pattern checker and check data on $i$th link

407 — All links checked ?

Yes

No

408 — $i=i+1$

409 — End

| 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|---|---|---|---|---|---|---|---|---|---|---|---|---|---|---|
| 1 | 1 | 1 | 1 | 1 | 1 | 1 | 0 | 0 | 0 | 0 | 0 | 0 | 1 | 0 | 0 | 0 | 0 | 0 | 1 | 1 | 0 | 0 | 0 | 0 | 1 | 0 | 1 | 0 | 0 | 0 | 1 |
| 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 | 61 | 62 | 63 | 64 |
| 1 | 1 | 1 | 0 | 0 | 1 | 0 | 0 | 0 | 1 | 0 | 1 | 1 | 0 | 0 | 1 | 1 | 1 | 0 | 1 | 0 | 1 | 0 | 0 | 1 | 1 | 1 | 1 | 1 | 0 | 1 | 0 |
| 65 | 66 | 67 | 68 | 69 | 70 | 71 | 72 | 73 | 74 | 75 | 76 | 77 | 78 | 79 | 80 | 81 | 82 | 83 | 84 | 85 | 86 | 87 | 88 | 89 | 90 | 91 | 92 | 93 | 94 | 95 | 96 |
| 0 | 0 | 0 | 1 | 1 | 1 | 0 | 0 | 0 | 1 | 0 | 0 | 1 | 0 | 0 | 1 | 1 | 0 | 1 | 1 | 0 | 1 | 0 | 1 | 1 | 0 | 1 | 1 | 1 | 1 | 0 | 1 |
| 97 | 98 | 99 | 100 | 101 | 102 | 103 | 104 | 105 | 106 | 107 | 108 | 109 | 110 | 111 | 112 | 113 | 114 | 115 | 116 | 117 | 118 | 119 | 120 | 121 | 122 | 123 | 124 | 125 | 126 | 127 | IDX. |
| 1 | 0 | 0 | 0 | 1 | 1 | 0 | 1 | 0 | 0 | 1 | 0 | 1 | 1 | 1 | 1 | 1 | 1 | 1 | 0 | 0 | 1 | 1 | 0 | 0 | 1 | 0 | 1 | 0 | 1 | 0 | val. |

801   Select PRBS seeds for low-speed links

802   Align clocks of low-speed links

803   Transmit test pattern on lowspeed links

804   Configure coalescer to recombine data

805   Enable pattern checker and check data on high-speed link

806   End

1000

Start

1001

For checking integrity of data propagated, in either direction, between a first data link coupled to an integrated circuit package, the first data link having a first data width and a first data speed, and a plurality of second data links within the integrated circuit package, each of which has a second data width narrower than the first data width and a second data speed narrower than the first data speed, propagate data with a known pattern (a) from the first data link to the plurality of second data links, or (b) from the plurality of second data links to the first data link

1002

Select bits of the propagated data, when transitioning (a) from the first data link to each link in the plurality of second data links, or (b) from each link in the plurality of second data links to the first data link, in a manner that preserves the known pattern

1003

When receiving the propagated data at (a) the plurality of second data links, or (b) the first data link, check for the known pattern End

FIG. 10

PRESERVING PATTERN CHECKING FOR DATA INTEGRITY ACROSS A SINGLE WIDER LINK AND MULTIPLE NARROWER LINKS

CROSS REFERENCE TO RELATED APPLICATIONS

This disclosure claims the benefit of commonly-assigned U.S. Provisional Patent Applications Nos. 63/529,123, 63/531,653 and 63/534,106, filed Jul. 26, 2023, Aug. 9, 2023 and Aug. 22, 2023, respectively, each of which is hereby incorporated by reference herein in its respective entirety.

FIELD OF USE

This disclosure relates to data integrity checking on serial data links. More particularly, this disclosure relates to preserving data patterns for integrity checking, whether propagating data from a faster, wider link to a group of slower, narrower links, or propagating data from a group of slower, narrower links onto a single faster, wider link.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the subject matter of the present disclosure.

Various techniques exist for checking data integrity on high-speed serial data links. For example, a particular data pattern, such as a pseudo-random bit sequence (PRBS), may be propagated across a link and checked at the receiving end to determine whether the pattern was altered during propagation, which would indicate a problem with the link. In some situations, data may be transferred, in either direction, between a wider, faster link and a group of narrower, slower links. In those situations, depending on the direction, either the data pattern on the wider, faster link is distributed to the narrower, slower links, or the data patterns on the narrower, slower links are coalesced or recombined onto the wider, faster link. Either way, the data pattern may be altered in a way that affects the ability to determine data integrity in the link.

SUMMARY

In accordance with implementations of the subject matter of this disclosure, a method for checking integrity of data propagated, in either direction, between a first data link having a first data width and a first data speed, and a plurality of second data links each of which has a second data width narrower than the first data width and a second data speed slower than the first data speed, includes propagating data with a known pattern (a) from the first data link to the plurality of second data links, or (b) from the plurality of second data links to the first data link, selecting bits of the propagated data when transitioning (a) from the first data link to each link in the plurality of second data links, or (b) from each link in the plurality of second data links to the first data link, in a manner that preserves the known pattern, and checking for the known pattern when receiving the propagated data at (a) the plurality of second data links, or (b) the first data link.

In a first implementation of such a method, when the first data link is coupled to an integrated circuit package and each of the second data links extends to a respective device within the integrated circuit package, and a particular one of the second data links extends beyond a first device in the integrated circuit package to a second device in the integrated circuit package, checking for the known pattern of the propagated data when receiving the propagated data at the plurality of second data links may include checking for the known pattern on the particular one of the second data links between the first device and the second device.

In a second implementation of such a method propagating data with the known pattern may include propagating a pseudo-random bit sequence (PRBS) pattern of a known order.

According to a first aspect of that second implementation, selecting bits of the propagated data, in a manner that preserves the PRBS pattern of the propagated data, may include selecting bits of the propagated data in round-robin fashion.

In a first instance of that first aspect, when transitioning from the first data link to each link in the plurality of second data links, selecting bits of the propagated data in round-robin fashion may include transferring each respective bit from the first data link to a next link in the plurality of second data links.

In a first variation of that first instance, when there are N data links in the plurality of second data links and a total of N×M bits in the PRBS test pattern, transferring each respective bit from the first data link to a next link in the plurality of second data links may include distributing each bit in a first group of N bits [N−1:0] of the first data link to a bit0 position of one of the second data links in round-robin fashion, distributing each bit in a second group of N bits [2N−1:N] of the first data link to a bit1 position of one of the second data links in round-robin fashion, distributing each bit in the third group of N bits [3N−1:2N] of the first data link to a bit2 position of one of the second data links in round-robin fashion, and continuing to distribute M−3 remaining groups of N bits until each bit in an Mth group of N bits [(M×N)−1:(M−1)×N] of the first data link has been distributed to a bit(M−1) position of one of the second data links in round-robin fashion.

In a second instance of the first aspect, when transitioning from the plurality of second data links to the first data link, selecting bits of the propagated data in round-robin fashion may include transferring a bit from a corresponding position in each respective link in the plurality of second data links to the first data link.

In a first variation of that second instance, when transitioning from the plurality of second data links to the first data link, the plurality of second data links may include a number of second data links that is a power of 2.

In a first alternative of that first variation, when transitioning from the plurality of second data links to the first data link, the known order of the PRBS pattern on each respective data link the plurality of second data links may be identical to the known order of the PRBS pattern on each other data link in the plurality of second data links.

In a first variant of that first alternative, when transitioning from the plurality of second data links to the first data link, a number of intervals between initial seeds of the PRBS patterns on each respective data link of the plurality of second data links is selected as a function of the known order of the PRBS pattern and the number of second data links in the plurality of second data links.

In a second variation of that second instance, when transitioning from the plurality of second data links to the first data link, when there are N second data links and the PRBS pattern includes N×M bits, selecting bits of the propagated data in round-robin fashion may include distributing a value in a bit0 position of each one of the N second data links, in round-robin fashion, to form a first group of N bits [N−1:0] of the first data link, distributing a value in a bit1 position of each one of the N second data links, in round-robin fashion, to form a second group of N bits [2N−1:N] of the first data link, distributing a value in a bit2 position of each one of the N second data links, in round-robin fashion, to form a third group of N bits [3N−1:2N] of the first data link, and continuing to distribute values in M−3 remaining bit(M−1) positions of each one of the N second data links, in round-robin fashion, to form an Mth group of N bits [(M×N)−1:(M−1)×N] of the first data link.

In accordance with implementations of the subject matter of this disclosure, apparatus for checking integrity of data propagated, in either direction, between a first data link having a first data width and a first data speed, and a plurality of second data links each of which has a second data width narrower than the first data width and a second data speed narrower than the first data speed, includes circuitry configured to propagate data with a known pattern (a) from the first data link to the plurality of second data links, or (b) from the plurality of second data links to the first data link, data mapping circuitry configured to select bits of the propagated data when transitioning (a) from the first data link to each link in the plurality of second data links, or (b) from each link in the plurality of second data links to the first data link, in a manner that preserves the known pattern, and circuitry configured to check for the known pattern when receiving the propagated data at (a) the plurality of second data links, or (b) the first data link. In a first implementation of such apparatus, the circuitry configured to check for the known pattern may include a single instance of pattern-checking circuitry for all of the apparatus.

In a second implementation of such apparatus, the circuitry configured to check for the known pattern may include multiple instance of identical pattern-checking circuitry throughout the apparatus.

In a third implementation of such apparatus, the circuitry configured to check for the known pattern when receiving the propagated data at the plurality of second data links may be configured to check for the known pattern on a portion of one of the second data links between a first device and a second device further from first data link than the first device.

In a fourth implementation of such apparatus, the circuitry configured to propagate data with the known pattern may include circuitry configured to propagate data with a pseudo-random bit sequence (PRBS) pattern of a known order.

According to a first aspect of that fourth implementation, the data mapping circuitry configured to select bits of the propagated data in a manner that preserves the PRBS pattern of the propagated data may be configured to select bits of the propagated data in round-robin fashion.

In a first instance of that first aspect, the data mapping circuitry configured to select bits of the propagated data in round robin fashion may be configured to, when transitioning from the first data link to each link in the plurality of second data links, transfer each respective bit from the first data link to a next link in the plurality of second data links.

In a first variation of that first instance, there may be N data links in the plurality of second data links and a total of N×M bits in the PRBS test pattern, and the data mapping circuitry configured to select bits of the propagated data in round robin fashion when transitioning from the first data link to each link in the plurality of second data links may be configured to distribute each bit in a first group of N bits [N−1:0] of the first data link to a bit0 position of one of the second data links in round-robin fashion, distribute each bit in a second group of N bits [2N−1:N] of the first data link to a bit1 position of one of the second data links in round-robin fashion, distribute each bit in the third group of N bits [3N−1:2N] of the first data link to a bit2 position of one of the second data links in round-robin fashion, and continue to distribute M−3 remaining groups of N bits until each bit in an Mth group of N bits [(M×N)−1:(M−1)×N] of the first data link has been distributed to a bit(M−1) position of one of the second data links in round-robin fashion.

In a second instance of that first aspect, the data mapping circuitry configured to select bits of the propagated data in round robin fashion may be configured to, when transitioning from the plurality of second data links to the first data link, transfer a bit from a corresponding position in each respective link in the plurality of second data links to the first data link.

In a first variation of that second instance, the plurality of second data links may include a number of second data links that is a power of 2.

In a first alternative of that first variation, the circuitry configured to propagate data with a known pattern may be configured to, when propagating data from the plurality of second data links to the first data link, propagate data on each respective data link the plurality of second data links wherein the known order of the PRBS pattern is identical to the known order of the PRBS pattern propagated on each other data link in the plurality of second data links.

In a first variant of that first alternative, wherein the circuitry configured to, when transitioning from the plurality of second data links to the first data link, propagate data with a known pattern, is configured to select initial seeds of the PRBS patterns on each respective data link in the plurality of second data links, with a number of intervals between the initial seeds of the PRBS patterns selected as a function of the known order of the PRBS pattern and the number of second data links in the plurality of second data links.

In a second variation of that second instance, there may be N data links in the plurality of second data links and a total of N×M bits in the PRBS test pattern, and the data mapping circuitry configured to select bits of the propagated data in round robin fashion, when transitioning from the plurality of second data links to the first data link, may be configured to coalesce values in a bit0 position of each one of the N second data links, in round-robin fashion, to form a first group of N bits [N−1:0] of the first data link, coalesce values in a bit1 position of each one of the N second data links, in round-robin fashion, to form a second group of N bits [2N−1:N] of the first data link, coalesce values in a bit2 position of each one of the N second data links, in round-robin fashion, to form a third group of N bits [3N−1:2N] of the first data link, and continue to coalesce values in M−3 remaining bit(M−1) positions of each one of the N second data links, in round-robin fashion, to form an Mth group of N bits [(M×N)−1: (M−1)×N] of the first data link.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which:

FIG. 7 is a table illustrating a PRBS7 pattern that may be used in implementations of the subject matter of this disclosure, showing intervals between pattern seeds;

FIG. 10 is a flow diagram illustrating a method in accordance with implementations of the subject matter of this disclosure.

DETAILED DESCRIPTION

Figure 1:
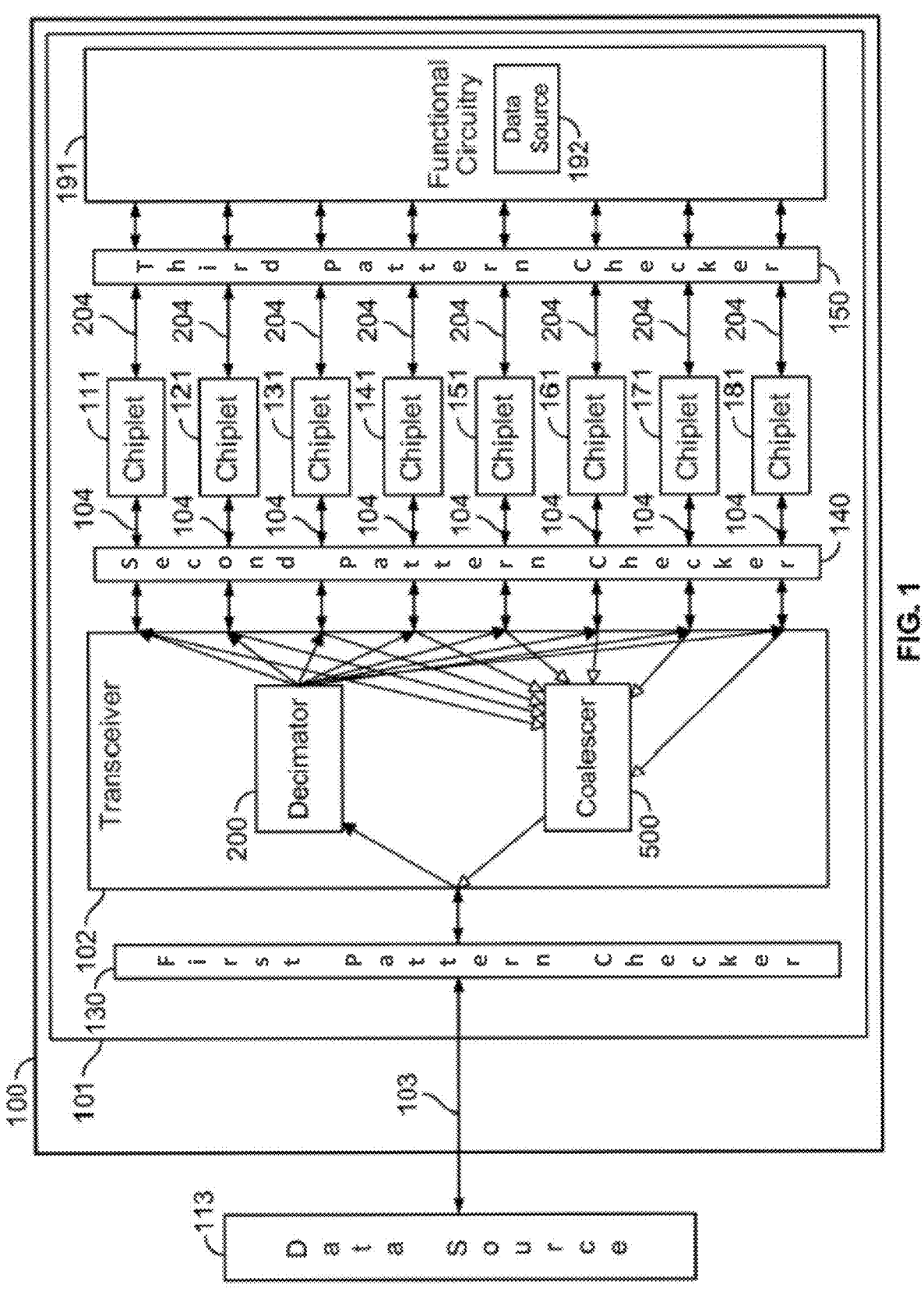
FIG. 1 is a block diagram of an integrated device package incorporating implementations of the subject matter of this disclosure.

As noted above, various techniques exist for checking data integrity in high-speed serial data links. For example, a particular data pattern, such as a pseudo-random bit sequence, may be propagated across a link and checked at the receiving end to determine whether the pattern was altered during propagation, which would indicate a problem with the link. In some situations, data may be transferred, in either direction, between a wider, faster link and a group of narrower, slower links. For example, the narrower, slower links may be die-to-die links between chiplets in an integrated circuit device package (e.g., according to the Universal Chiplet Interconnect Express, or UCIe, standard) and the wider, faster link may be a link external to the package. In those situations, depending on the direction, either the data pattern on the wider, faster link is distributed to the narrower, slower links, or the data patterns on the narrower, slower links are coalesced or recombined onto the wider, faster link. Either way, the data pattern may be altered by the transition in a way that affects the ability to determine data integrity in the link.

For example, if the data pattern for integrity checking is a PRBS pattern of order n (PRBSn), and the data is being propagated across a single link, pattern checking circuitry designed to check a PRBSn pattern may be used to check data propagation in either direction over that link. However, if the data is being propagated from a single link of a certain width at a certain speed, to a number of narrower links at lower speed (providing the same aggregate width and speed as the original link), the PRBSn pattern may not be maintained, either making it necessary to use different pattern checking circuitry—e.g., for a PRBS pattern of a different order—if any pattern is maintained at all, or destroying the original pattern to a degree that it is not even be possible to perform pattern checking at all in such a situation. Similarly, if data is being propagated across a number of narrower, slower links with PRBS test patterns of order q (PRBSq) for coalescing or recombining onto one wider, faster link, it may not be possible to use the same pattern checking circuitry on the wider, faster link that would be used on those individual narrower, slower links, and it may be that it is not even possible to perform pattern checking on the wider, faster link at all in such a situation.

However, in accordance with implementations of the subject matter of this disclosure, the ability to perform pattern checking for data integrity is preserved when propagating data from a wider, faster link to a plurality of narrower, slower links, and also when propagating data from a plurality of narrower, slower links to a wider, faster link. When propagating data from a wider, faster link to a plurality of narrower, slower links, where the data on the wider, faster link conforms to a particular pattern for data integrity testing, the ability to perform such data integrity testing on the narrower, slower links is preserved by carefully selecting the method for distributing the data from the wider, faster link to the plurality of narrower, slower links. Similarly, when propagating data from the plurality of narrower, slower links to the wider, faster link, where the data on each of the narrower, slower links conforms to a particular pattern for data integrity testing, the ability to perform such data integrity testing on the wider, faster link is preserved by (a) carefully selecting the method for distributing the data from the plurality of narrower, slower links to the wider, faster link, (b) carefully selecting the particular pattern (e.g., the seeds of the PRBS pattern on each link) within the plurality of narrower, slower links, and (c) carefully selecting the number of links in the plurality of narrower, slower links.

Specifically, when propagating data from a wider, faster link to a plurality of narrower, slower links, where the data on the wider, faster link conforms to a particular pattern for data integrity testing, the ability to perform such data integrity testing on the narrower, slower links may be preserved by selecting one individual bit at a time from the wider, faster link and distributing the individual bit, so selected, to a different one of the links in the plurality of narrower, slower links—e.g., in round-robin fashion or some other fixed distribution pattern (as opposed to a more typical distribution of bits in which, if there are m of the narrower, slower links, a block of m bits is selected for distribution all at once to one of the links in the plurality of narrower, slower links, and then another block of m bits is selected for distribution all at once to another one of the links in the plurality of narrower, slower links, and so on). If a round-robin distribution of individual bits from the wider, faster link to the narrower, slower links is used, then if the original data stream on the wider faster link met the PRBS pattern for data integrity checking, using a particular PRBS pattern checker, then each of the data streams on a respective one of the narrower, slower links also will meet the PRBS pattern checking, using the same PRBS pattern checker (meaning either the very same pattern checking circuit, or a separate pattern checking circuit of the same design), which reduces complexity and cost for pattern checking.

Likewise, when propagating data from a plurality of narrower, slower links to a wider, faster link, where the data on each respective one of the narrower, slower links conforms to a particular pattern for data integrity testing, the ability to perform such data integrity testing on the wider, faster link may be preserved by propagating one individual bit at a time from each one of the narrower, slower links, in round-robin fashion or some other fixed pattern, to the wider, faster link. However, at least if a PRBS pattern is used as the pattern for data integrity checking, then when coalescing or recombining the data streams from the narrower, slower links into one data stream on the wider, faster link, three additional conditions may be imposed. First, the PRBS pattern on each of the individual narrower, slower links should be of the same order a (i.e., the PRBS pattern on each link should be PRBSa—e.g., PRBS7, PRBS11, PRBS13, PRBS23, PRBS31, etc.). Second, the number m of narrower, slower links should be a positive, nonzero power of 2—i.e., $m=2^n$ (where $n=1, 2, 3, \ldots$ ). Third, the number of intervals between initial seeds of the PRBS patterns for the individual ones of the narrower, slower links should be $2^a/m+(2^a-1)k$ (where $k=0, 1, 2, 3, \ldots$ ), as described in more detail below. Nevertheless, if those conditions are met, then PRBS pattern checking on the wider, faster link, and the narrower, slower link, can be performed using the same PRBS pattern checker (meaning either the very same pattern checking circuit, or a separate pattern checking circuit of the same design), which reduces complexity and cost for pattern checking.

The subject matter of this disclosure may be better understood by reference to FIGS. 1-10. FIGS. 1-8 explain the subject matter of this disclosure in the context of an implementation of an integrated circuit device package 100 including a plurality of chiplets, possible along with other functional circuitry. In addition, other implementations may fall within the subject matter of this disclosure. For example, as explained in connection with FIG. 9, the subject matter of this disclosure may allow the checking of a transmission from end-to-end of a system, in which there are multiple transitions between links of the same or different widths and speeds, using a single pattern-checking circuit.

As seen in FIG. 1, integrated circuit device package 100 includes a substrate 101 on which are mounted eight chiplets 111, 121, 131, 141, 151, 161, 171, 181, and additional functional circuitry 191 which may include one or more larger integrated circuit dies, or additional chiplets. A transceiver 102 couples a high-speed serial data link 103 outside integrated circuit device package 100 to the various chiplets 111, 121, 131, 141, 151, 161, 171, 181 and to other circuitry 191. The in-package links 104 between transceiver 102 and chiplets 111, 121, 131, 141, 151, 161, 171, 181, as well as other in-package links 204 (e.g., among chiplets 111, 121, 131, 141, 151, 161, 171, 181, as well as between any of chiplets 111, 121, 131, 141, 151, 161, 171, 181 and any other circuitry 191) may be short-reach links, such as those conforming to the UCIe standard.

Implementations of the subject matter of this disclosure apply when short-reach in-package links 104 are slower and narrower than external link 103, although there may be other implementations within the scope of the subject matter of this disclosure.

In the implementation shown in FIG. 1, a PRBS test pattern signal may be sent onto device 100 via external link 103 from a remote device such as data source 113. The PRBS test pattern signal may then be decimated, or distributed, by decimator circuitry 200 (see discussion below in connection with FIG. 2) of transceiver 102 onto narrower, slower in-package links 104. The decimated PRBS signal received at second pattern checker 140 can be checked to see if the PRBS pattern was either maintained or altered while traversing links 103, 104. It may further be desired to check whether the pattern remains unaltered after traversing either in-package links 104 at one of chiplets 111, 121, 131, 141, 151, 161, 171, 181, or in-package links 204 between one of chiplets 111, 121, 131, 141, 151, 161, 171, 181 and functional circuitry 191, or both, using third pattern checker 150.

Similarly, a PRBS test pattern signal may be sent in-package links 104, destined for external link 103, from a data source such as data source 192 in functional circuitry 191. The PRBS test pattern signal may then be combined, or coalesced, by coalescer circuitry 500 (see discussion below in connection with FIG. 5) of transceiver 102 onto wider, faster external link 103. The coalesced PRBS signal received at a first pattern checker 130 can be checked to see if the PRBS pattern was either maintained or altered while traversing links 103, 104, 204.

Whether the signal being tested originates off-chip and has its PRBS pattern tested at the second pattern checker 140 or third pattern checker 150 after being split, or decimated, in transceiver 102, or whether the signal being tested originates on-chip and has its PRBS pattern tested at the first pattern checker 130 after being merged, or coalesced, in transceiver 102, it would be desirable to use the same checking circuitry as the first pattern checker 130 and second and third pattern checkers 140/150, or at least to use the same checking circuitry design for the first pattern checker 130 and second and third pattern checkers 140/150. However, unless care is taken in the decimation or coalescing in accordance with the subject matter of this disclosure, the PRBS pattern may be altered or destroyed by the decimation or coalescing operation. For example, the decimated or coalesced data may no longer follow any PRBS pattern, or may follow a PRBS pattern of a different order than the initial PRBS pattern. Either way, it would not be possible to use the same pattern-checking circuitry both before and after the decimation or coalescing, and it may not be possible to perform any pattern checking at all after the decimation or coalescing.

As noted above, in order to preserve the PRBS pattern for data integrity checking when decimating data from a wider, faster link onto a plurality of narrower, slower links, where the data on the wider, faster link conforms to a particular pattern for data integrity testing, one individual bit should be selected at a time, in order, from the wider, faster link, and the individual bit, so selected, should be distributed to a different one of the links in the plurality of narrower, slower links—e.g., in round-robin fashion or according to some other fixed pattern (as opposed to a more typical distribution of bits in which, if there are m of the narrower, slower links, a block of m bits is selected for distribution all at once to one of the links in the plurality of narrower, slower links, and then another block of m bits is selected for distribution all at once to another one of the links in the plurality of narrower, slower links, and so on). If a round-robin distribution of individual bits from the wider, faster link to the narrower, slower links is used, then if the original data stream on the wider faster link met the PRBS pattern checking, using a particular PRBS pattern checker, then each of the data streams on a respective one of the narrower, slower links also will meet the PRBS pattern checking, using a particular PRBS pattern checker.

Figure 2:
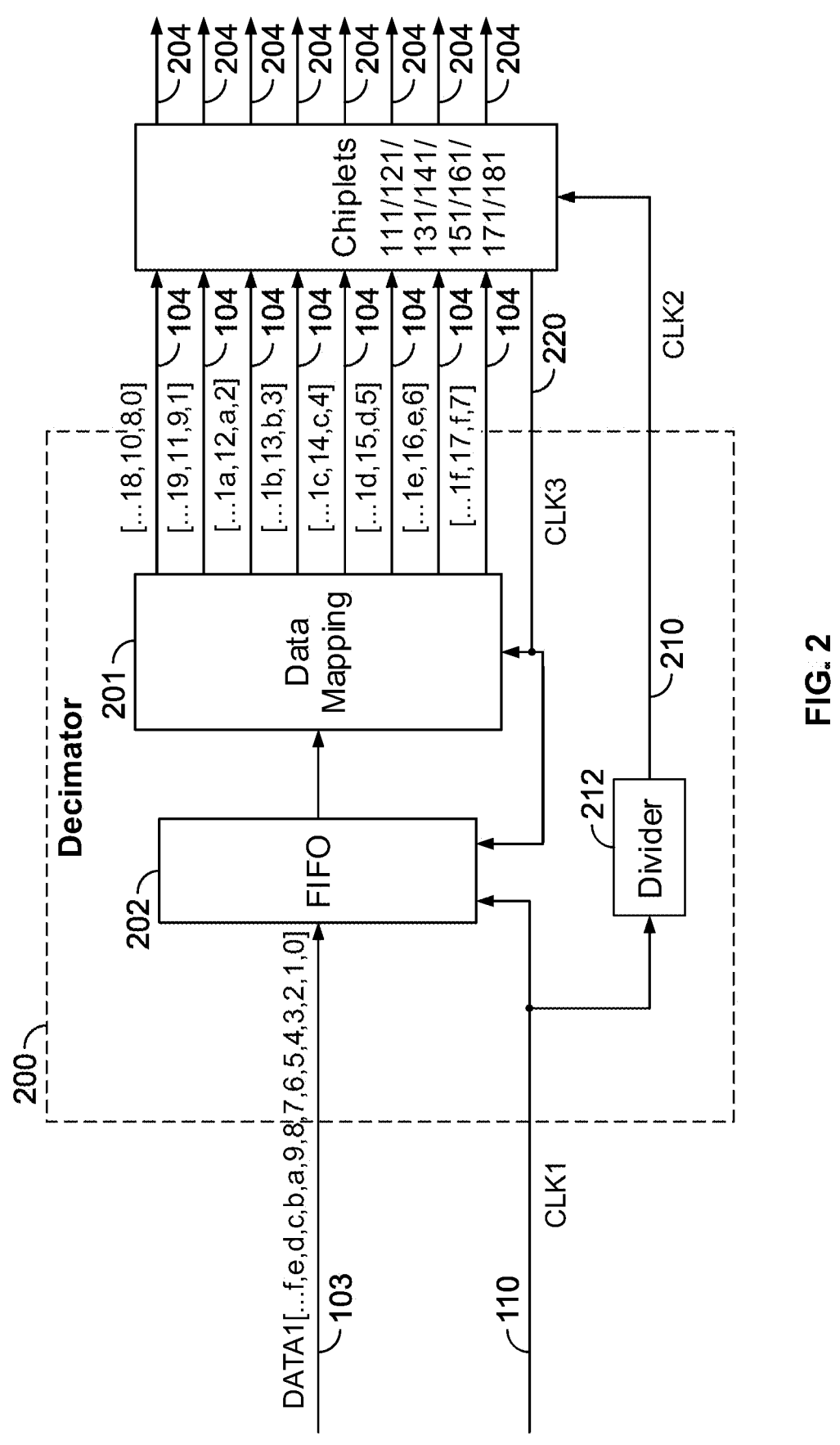
FIG. 2 is a block diagram of decimation circuitry in accordance with implementations of the subject matter of this disclosure.
Figure 3:
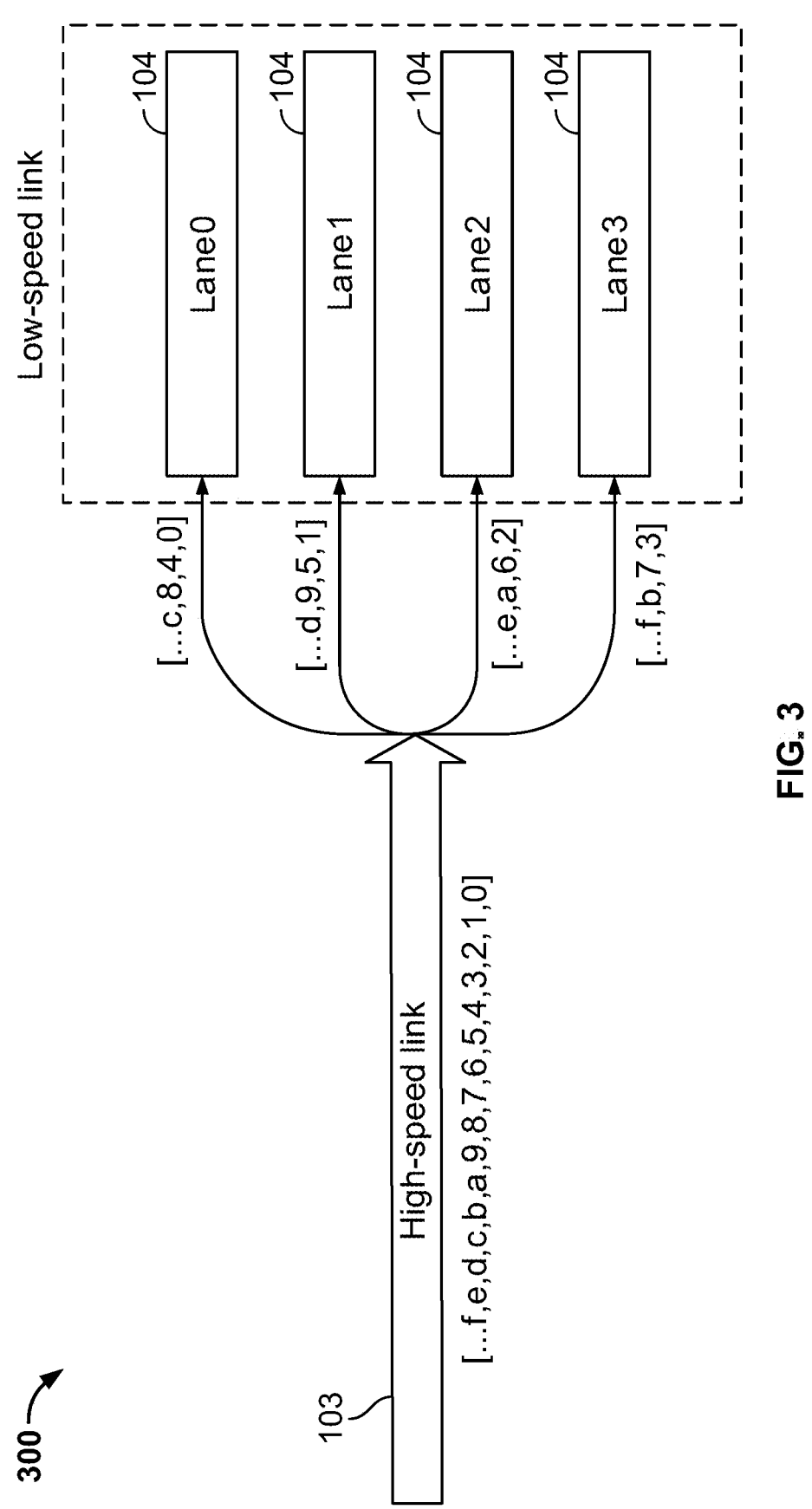
FIG. 3 is a graphic representation of decimation of a data pattern in accordance with implementations of the subject matter of this disclosure.
Figure 4:
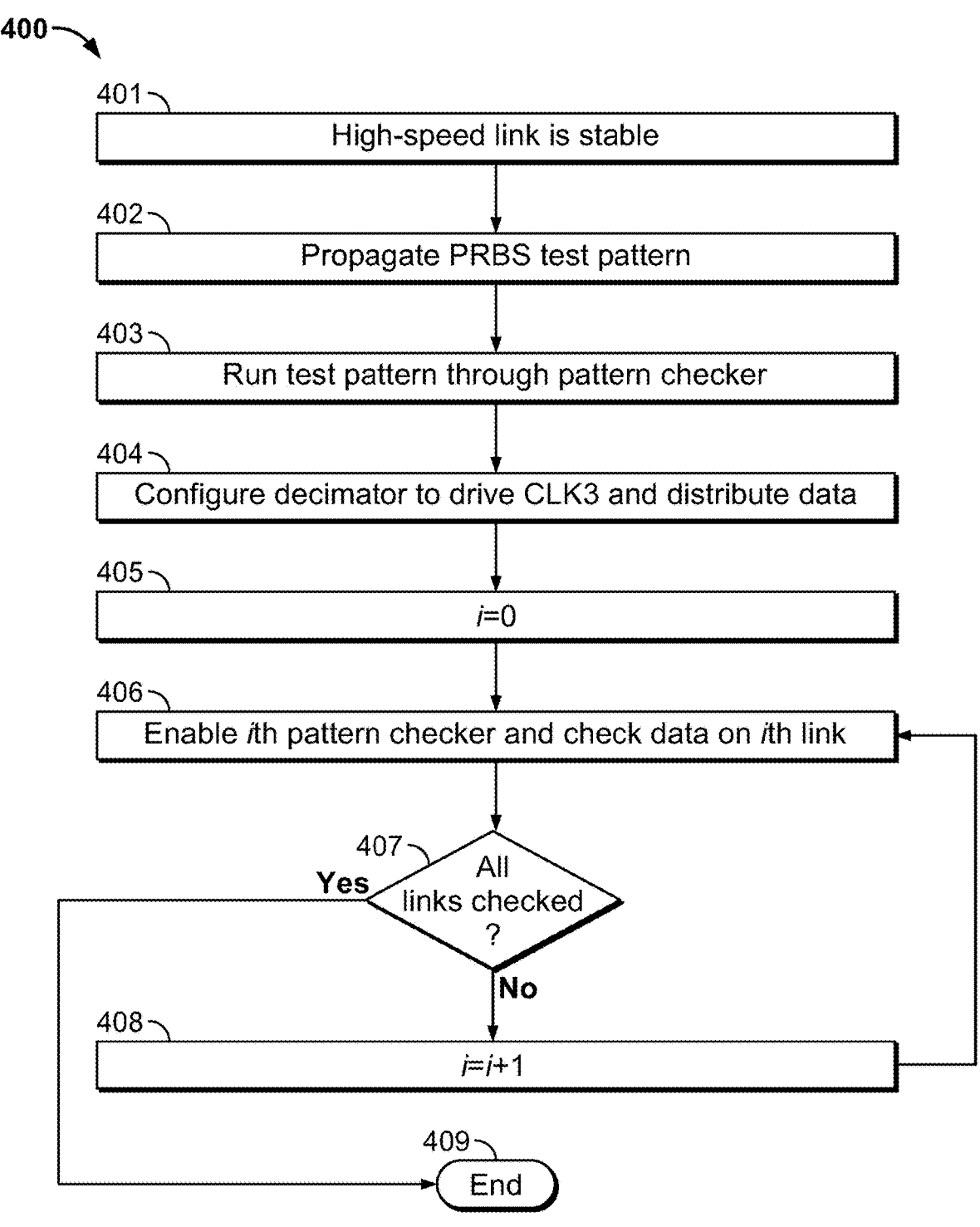
FIG. 4 is a flow diagram illustrating an implementation of decimation in accordance with implementations of the subject matter of this disclosure.

Transceiver 102 may include decimation circuitry 200 as shown in FIG. 2 to perform decimation in accordance with the subject matter of this disclosure. Decimation in accordance with the subject matter of this disclosure may be from one faster link to any number m of slower links. However, as discussed below, in order for the slower links to be recombined in the other direction, the number m of slower links should be $m=2^n$ ($n=1, 2, 3, \ldots$ ). In the particular implementation shown in FIG. 2, $m=2^3=8$.

In this implementation, decimation circuitry 200 includes data mapping circuitry 201 configured to distribute individual bits in round-robin fashion from the wider, faster, one-lane link 103 to the eight narrower, slower, one-lane links 104 propagated from the eight chiplets 111, 121, 131, 141, 151, 161, 171, 181. The data on narrower, slower, one-lane links 104 may be further propagated to a set of narrower, slower, one-lane links 204 coupling chiplets 111, 121, 131, 141, 151, 161, 171, 181 to additional chiplets or functional circuit 191 (FIG. 1). The high-speed link 103 may be, for example, a 212.5 Gbps link with a 256-bit-per-lane bus, while each low-speed link 104 may be 26.5625 Gbps link with a 32-bit-per-lane bus.

Link 103 and each of links 104 may be in the same clock domain. For example, the integrated circuit package containing chiplets 111, 121, 131, 141, 151, 161, 171, 181 and links 104 may be part of a product, and link 103 may connect that integrated circuit package to another integrated circuit package in the same product. In such a case, FIFO 202 and clock divider 212 may be omitted. However, where link 103 and link 104 are in different clock domains, FIFO 202 may be included in decimation circuitry 200 to bridge the clock domain boundary. Clock divider 212 may be provided to divide down high-speed clock 110 (CLK1) on link 103 to a low-speed reference clock 210 (CLK2) that is used by a clock source such as a phase-locked loop (PLL; not shown) in the low-speed domain to generate low-speed clock 220 (CLK3) of links 104, to eliminate any frequency offset or phase difference between high-speed clock 110 (CLK1) and low-speed clock 220 (CLK3).

Data mapping circuitry 201 may operate according to the following rules to map the high-speed data to the low-speed links 104, assuming that there are N low-speed links 104 and a total of N×M bits to be distributed (e.g., the PRBS test pattern includes N×M bits):

1. Distribute each bit in the first group of N bits [N−1:0] of the high-speed link to the bit0 position of one of the low-speed links in round-robin fashion.
2. Distribute each bit in the second group of N bits [2N−1:N] of the high-speed link to the bit1 position of one of the low-speed links in round-robin fashion.
3. Distribute each bit in the third group of N bits [3N−1:2N] of the high-speed link to the bit2 position of one of the low-speed links in round-robin fashion.
4. Continue distributing the remaining M−3 groups of N bits until each bit in the Mth group of N bits [(M×N)−1:(M−1)×N] of the high-speed link has been distributed to the bit(M−1) position of one of the low-speed links in round-robin fashion.

This may be seen graphically in FIG. 2, which is an eight-lane example. As can be seen, bits [7,6,5,4,3,2,1,0] of the high-speed link 103 end up in the bit0 position of each of low-speed links 104, bits [f,e,d,c,b,a,9,8] of the high-speed link 103 end up in the bit1 position of each of low-speed links 104, and so on. Similarly, in the four-lane example 300 of FIG. 3 (n=2; m=$2^2$=4), bits [3, 2, 1, 0] of the high-speed link 103 end up in the bit position of each of low-speed links or lanes 104, bits [7,6,5,4] of the high-speed link 103 end up in the bit1 position of each of low-speed links or lanes 104, and so on.

The preservation of the PRBS pattern by such a distribution of values may be proven mathematically. For example, for a PRBS7 pattern:

Given $X_i$ xor $X_{i+1}$=$X_{i+7}$ one can prove that $X_i$ xor $X_{i+n}$=$X_{i+7n}$ (n=$2^m$).

First, $X_i$ xor $X_{i+2}$=($X_i$ xor $X_{i+1}$) xor ($X_{i+1}$ xor $X_{i+2}$)=$X_{i+7}$ xor $X_{i+1+7}$=$X_{i+7+7}$=$X_{i+7*2}$ Second, $X_i$ xor $X_{i+4}$=($X_i$ xor $X_{i+2}$) xor ($X_{i+2}$ xor $X_{i+4}$) =$X_{i+7+2}$ xor $X_{i+2+7+2}$=$X_{i+7+2+7+2}$=$X_{i+7+4}$ Third, $X_i$ xor $X_{i+8}$=($X_i$ xor $X_{i+4}$) xor ($X_{i+4}$ xor $X_{i+8}$)=$X_{i+7+4}$ xor $X_{i+4+7+4}$=$X_{i+7*4+7*4*4}$=$X_{i+7*8}$

. . .

Lastly, $X_i$ xor $X_{i+2^m}$=($X_i$ xor $X_{i+2^{m-1}}$) xor ($X_{i+2^{m-1}}$ xor $X_{i+2^m}$)=$X_{i+7*2^{m-1}}$ xor $X_{i+2^{m-1}+7+2^{m-1}}$=$X_{i+7+2^{m-1}+7+2^{m-1}}$=$X_{i+7+2^m}$ Thus it is proven that $X_i$ xor $X_{i+n}$=$X_{i+7n}$ (n=$2^m$).

For data integrity testing, the first pattern checker 130, designed for a PRBS pattern of a particular order, is present in the high-speed link 103. The second and third pattern checkers 140/150, designed for a PRBS pattern of that same order, is present in each low-speed link 104, after the point at which the low-speed links 104 diverge from the high-speed links 103 and before the low-speed links 104 reach the respective chiplets 111, 121, 131, 141, 151, 161, 171, 181. Alternatively, each of the pattern checkers 140/150 may be positioned in a respective one of the further narrower, slower, one-lane links 204 between the respective chiplets 111, 121, 131, 141, 151, 161, 171, 181 and a respective portion of further functional circuitry 191 of integrated circuit device package 100. And by the rule of decimation, the pattern checkers 130, 140, 150 could include the same pattern checking circuitry.

Data integrity may be tested in the decimation direction when the connections between wider, faster link 103 and narrower, slower links 104 are first established. As seen in method 400 diagrammed in FIG. 4, once high-speed link 103 is stable at 401, a PRBS test pattern is propagated on link 103 at 402 and tested, at 403, by the first pattern checker 130. Data mapping circuitry 201 is configured, at 404, to run at the slower clock rate (CLK3) of links 104, and to distribute data according to the decimation mapping described above. At 405, a counter i is initialized to '0' and at 406 the $i^{th}$ low-speed pattern checker of the second pattern checker 140 is enabled and data on the $i^{th}$ link is checked. At 407, it is determined whether all low-speed lanes have been checked. If so method 400 ends at 409. Otherwise, the counter i is incremented at 408 and flow returns to 406 where the next low-speed pattern checker of the second pattern checker 140 is enabled and data on the $i^{th}$ link is checked. The loop through 406, 407 and 408 continues until all links have been checked, and then, assuming no data integrity problems are detected, normal data transfer operations may begin.

Figure 5:
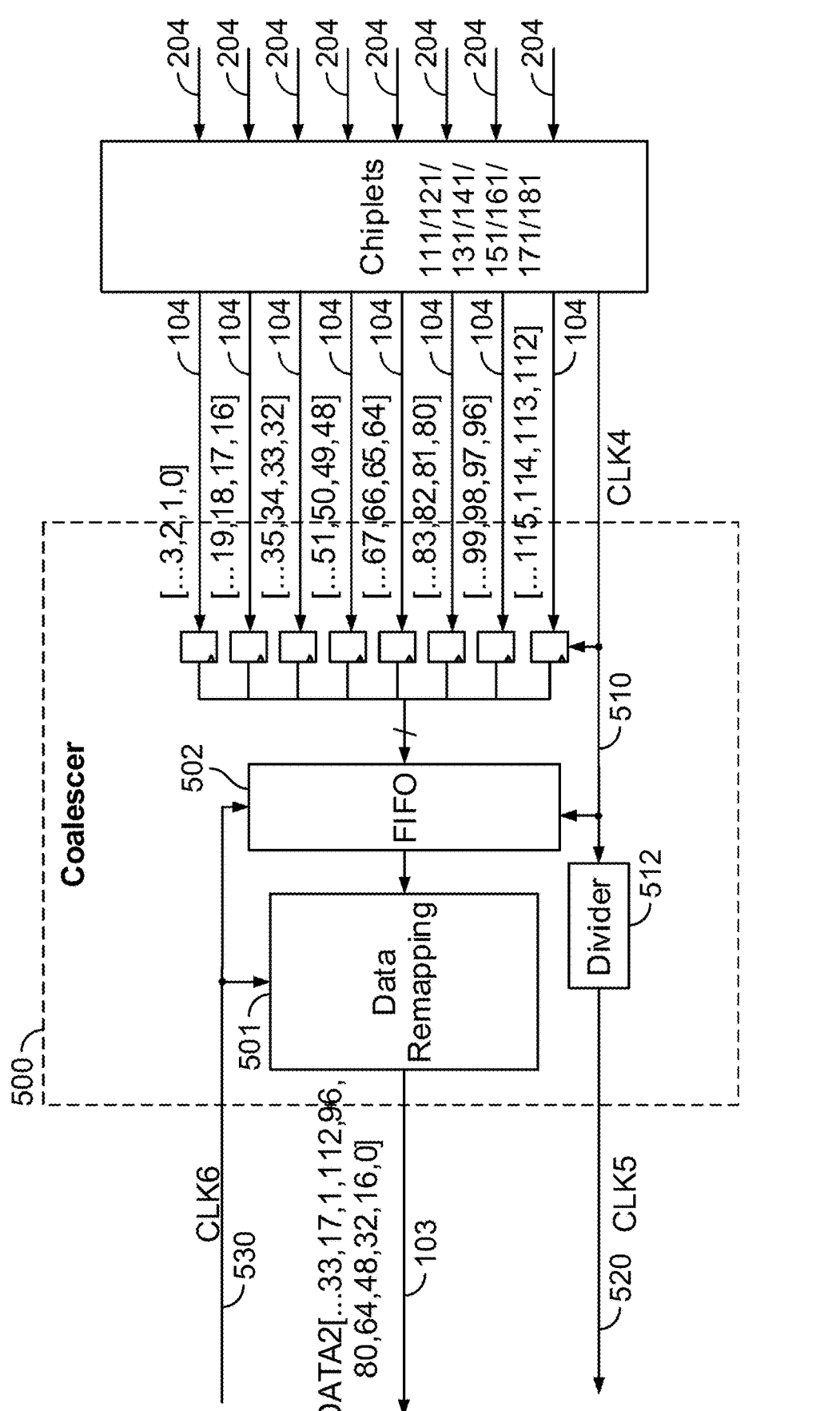
FIG. 5 is a block diagram of coalescing or recombining circuitry in accordance with implementations of the subject matter of this disclosure.
Figure 6:
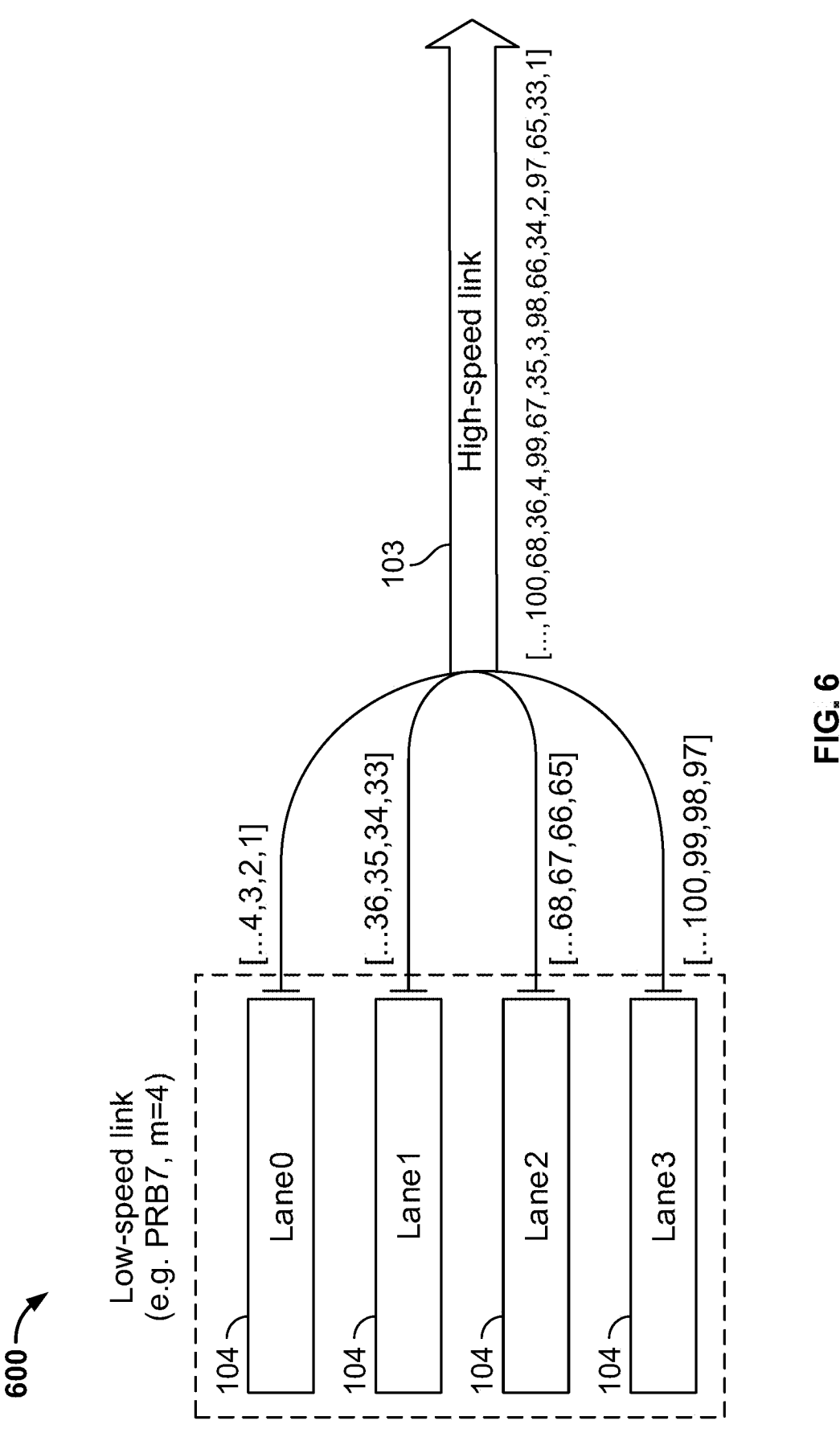
FIG. 6 is a graphic representation of coalescing or recombining of a data pattern in accordance with implementations of the subject matter of this disclosure.
Figure 8:
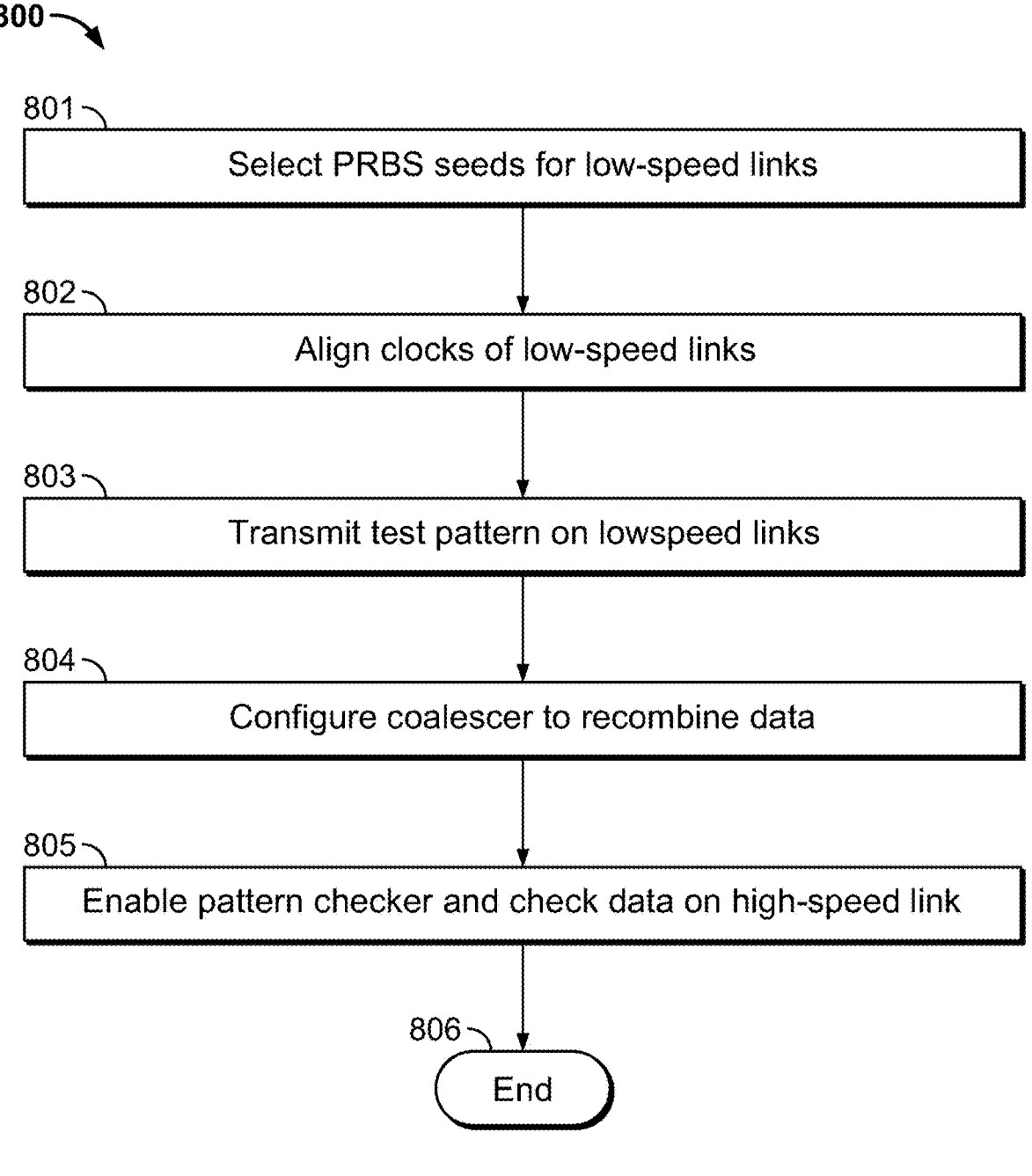
FIG. 8 is a flow diagram illustrating an implementation of coalescing or recombining in accordance with implementations of the subject matter of this disclosure.

Transceiver 102 may include coalescing or recombining circuitry 500 as shown in FIG. 5 to perform coalescing or recombination in accordance with the subject matter of this disclosure. Coalescing in accordance with the subject matter of this disclosure may be from any number m of links down to one link, as long as m=$2^n$ (n=1, 2, 3, . . . ). In the particular implementation shown in FIG. 5, m=$2^3$=8 (i.e., n=3).

In this implementation, coalescing circuitry 500 includes data remapping circuitry 501 configured to aggregate individual bits in round-robin fashion from the eight narrower, slower, one-lane links 104 propagated from the eight chiplets 111, 121, 131, 141, 151, 161, 171, 181, to the wider, faster, one-lane link 103. The data on narrower, slower, one-lane links 104 may have been propagated from a further set of narrower, slower, one-lane links 204 coupling chiplets 111, 121, 131, 141, 151, 161, 171, 181 to additional chiplets or functional circuit 191 (FIG. 1). The high-speed link 103 may be, for example, a 212.5 Gbps link with a 256-bit-per-lane bus, while each low-speed link 104 may be 26.5625 Gbps link with a 32-bit-per-lane bus.

Link 103 and each of links 104 may be in the same clock domain. For example, the integrated circuit package containing chiplets 111, 121, 131, 141, 151, 161, 171, 181 and links 104 may be part of a product, and link 103 may connect that integrated circuit package to another integrated circuit package in the same product. In such a case, FIFO 502 and clock divider 512 may be omitted. However, where link 103 and link 104 are in different clock domains, FIFO 502 may be included in recombining circuitry 500 to bridge the clock domain boundary. Clock divider 512 may be provided to divide down low-speed clock 510 (CLK4) on links 104 to a lower-speed reference clock 520 (CLK5) that is used by a clock source such as a phase-locked loop (PLL; not shown) in the high-speed domain to generate high-speed clock 530 (CLK6) of link 103, to eliminate any frequency offset or phase difference between high-speed clock 530 (CLK6) and low-speed clock 510 (CLK4).

Data-mapping circuitry 501 may operate according to the following rules to map the low-speed data on links 104 to the high-speed link 103, assuming that there are N low-speed links 104 and a total of N×M bits to be aggregated (e.g., the PRBS test pattern includes N×M bits):

1. Coalesce the values in the bit0 position of each one of the N low-speed links, in round-robin fashion, to form the first group of N bits [N−1:0] of the high-speed link.
2. Coalesce the values in the bit position of each one of the N low-speed links, in round-robin fashion, to form the second group of N bits [2N−1:N] of the high-speed link.
3. Coalesce the values in the bit2 position of each one of the N low-speed links, in round-robin fashion, to form the third group of N bits [3N−1:2N] of the high-speed link.
4. Continue coalescing the values in the remaining M−3 bit(M−1) positions of each one of the N low-speed links, in round-robin fashion, to form the Mth group of N bits [(M×N)−1:(M−1)×N] of the high-speed link.

This may be seen graphically in FIG. 5, which is an eight-lane example. As can be seen, the $0^{th}$ bits of all of the low-speed links 104 end up as first eight bits [112,96,80, 64,48,32,16,0] of the high-speed link 103, the $1^{st}$ bits of all of the low-speed links 104 end up as second group of eight bits [113,97,81,65,49,33,17,1] of the high-speed link 103, and so on. Similarly, in the four-lane example 600 of FIG. 6 (n=2; m=$2^2$=4), the $0^{th}$ bits of all of the low-speed links or lanes 104 end up as first four bits [97,65,33,1] of the high-speed link 103, the $1^{st}$ bits of all of the low-speed links or lanes 104 end up as second group of four bits [98,66,34,2] of the high-speed link 103, and so on.

As an additional consideration in the coalescing direction, the number of intervals between initial seeds of the PRBS patterns for the individual ones of the narrower, slower links should be $2^a/m+(2^a−1)k$ (where a is the order of the PRBS pattern, m is the number of narrower, slower links, and k=0, 1, 2, 3, . . . ). When k=0, this collapses to $2^a/m$. If k=0, a=7 and m=4, the number of intervals is $2^7/4$=128/4=32. An example is shown in FIG. 7, which shows a table including, on the even rows, the 127 repeating values of a PRBS7 pattern, and, on the odd rows, the index for each value below it. Because $2^a/m$=32, each seed begins 32 positions after the beginning of the previous seed. Thus, the seed for lane 0 is 7'b1111111, the seed for lane 1 is 7'b1110010, the seed for lane 2 is 7'b0001110, and the seed for lane 3 is 7'b1000110. In some implementations, the PRBS sequence itself could be stored in a memory, such as a look-up table, with pointers identifying the start locations of each seed based on the formula described above.

Data integrity may be tested in the coalescing direction when the connections between wider, faster link 103 and narrower, slower links 104, as well as links 204 which carry data from functional circuitry 191 to links 104, are first established. As seen in method 800 diagrammed in FIG. 8, first, at 801, PRBS seeds for the low-speed links 104 are selected as described above. At 802, clocks of low-speed links 104 and low-speed links 204 are aligned to minimize or eliminate frequency offset or phase difference between different ones of links 104 or different ones of links 204. At 803, transmission of the PRBS pattern on links 204 and 104 begins. At 804, the recombining/coalescing circuitry 500 is configured with the relative widths and data rates of links 103 and 104 according to the recombination mapping described above. At 805, the first pattern checker 130 (or high-speed pattern checker) is enabled and the recombined data on link 103 is checked. Method 800 then ends at 806, and then, assuming no data integrity problems are detected, normal data transfer operations may begin.

Figure 9:
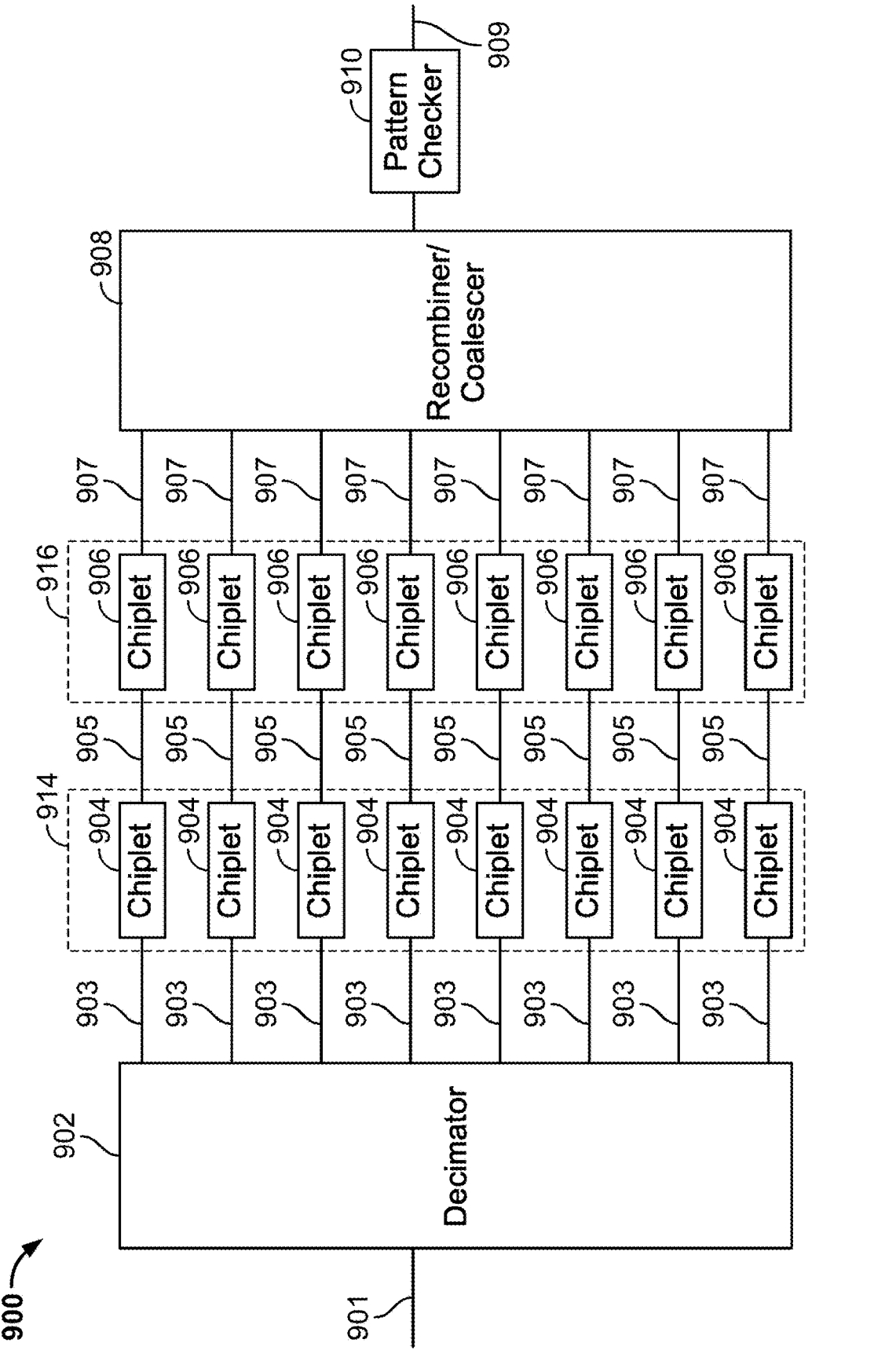
FIG. 9 is a diagram of an illustrative implementation in which a system having multiple links can be checked using a single pattern checker at one end of the system.

FIG. 9 shows a larger system 900 in which the subject matter of this disclosure may be implemented. In system 900, a high-speed data link 901 is split in decimator 902 into a plurality of narrower, slower links 903, which propagate to a first group of devices 904, which may be grouped in a single package 914. Another set of narrower, slower links 905 couples devices 904 to a second group of devices 906, which may be grouped in a single package 916. A third set of narrower, slower links 907 propagate from devices 906, and are recombined by recombining/coalescing circuitry 908 into a single wider, faster link 909 for further propagation.

In system 900, a test pattern (e.g., a PRBS test pattern as discussed above) may be transmitted on link 901, and a single pattern checker 910 (e.g., a PRBS pattern checker) may be placed on link 909. Proper operation of the entire system 900, including decimator 902 and recombining/coalescing circuitry 908, as well as all of the intermediate links 903, 905, 907 and integrated circuit devices 904, 906, as well as any intermediate decimation or coalescing circuitry in implementations (not shown) where the link width changes more than once, may be tested by observing whether the test pattern is correct at the single pattern checker 910 at the ultimate receiving end, rather than having to provide multiple pattern checkers throughout the system. Alternatively, or in addition, additional pattern checkers (not shown) may be placed at some or all of the intermediate stages of system 900, which can individually test the pattern propagating from link 901 to link 909 at various intermediate links, but all of those pattern checkers can be of the same design, reducing complexity and cost even where multiple pattern checkers are provided.

In addition, while in system 900 a pattern checker 910 is shown only at the link 909 end for checking patterns originating at the link 901 end, a pattern checker (not shown) may be provided at the link 901 end for checking patterns originating at the link 909 end, without the need for pattern checkers throughout the system. Again, as an alternative, additional pattern checkers (not shown) may be placed at some or all of the intermediate stages of system 900, which can individually test the pattern propagating from link 909 to link 901 individually at various intermediate links, but all of those pattern checkers can be of the same design, reducing complexity and cost even where multiple pattern checkers are provided. If such intermediate pattern checkers are provided, the same intermediate pattern checkers could be used in either direction.

A generalized method 1000 according to implementations of the subject matter of this disclosure is diagrammed in FIG. 10. Method 1000 begins at 1001, where, for checking integrity of data propagated, in either direction, between a first data link coupled to an integrated circuit package, the first data link having a first data width and a first data speed, and a plurality of second data links within the integrated circuit package, each of which has a second data width narrower than the first data width and a second data speed narrower than the first data speed, data is propagated with a known pattern (a) from the first data link to the plurality of second data links, or (b) from the plurality of second data links to the first data link. At 1002, bits of the propagated data are selected, when transitioning (a) from the first data link to each link in the plurality of second data links, or (b) from each link in the plurality of second data links to the first data link, in a manner that preserves the known pattern. At 1003, when receiving the propagated data at (a) the plurality of second data links, or (b) the first data link, the known pattern is checked for. Method 1000 then ends.

Thus it is seen that methods and apparatus for data integrity checking on serial data links, which preserve data patterns for integrity checking, whether propagating data from a faster, wider link to a group of slower, narrower links, or propagating data from a group of slower, narrower links onto a single faster, wider link, have been provided. This allows a single pattern checker design, and, in some implementations, a single pattern checker, to be used for data integrity checking for an entire system.

As used herein and in the claims which follow, the construction "one of A and B" shall mean "A or B."

It is noted that the foregoing is only illustrative of the principles of the invention, and that the invention can be practiced by other than the described embodiments, which are presented for purposes of illustration and not of limitation, and the present invention is limited only by the claims which follow.

What is claimed is:

1. A method for checking integrity of data propagated, in either direction, between a first data link having a first data width and a first data speed, and a plurality of second data links each of which has a second data width narrower than the first data width and a second data speed slower than the first data speed, the method comprising:

transferring bits of data with a known pattern (a) from the first data link to each link in the plurality of second data links, or (b) from each link in the plurality of second data links to the first data link, the transferring of the bits from the first data link to each link in the plurality of second data links comprises distributing the bits one bit at a time and in a round-robin fashion from the first data link to the plurality of second data links, and the transferring of the bits from each link in the plurality of second data links to the first data link comprises transferring the bits one bit at a time and in a round-robin fashion from the plurality of second data links to the first data link; and checking the integrity of the data by checking for the known pattern when receiving the data at (a) the plurality of second data links, or (b) the first data link.

2. The method according to claim 1, wherein:

the first data link is coupled to a transceiver in an integrated circuit package the plurality of second data links extend from the transceiver to a respective chiplet in the integrated circuit package; and checking for the known pattern when receiving the data at the plurality of second data links comprises checking for the known pattern on at least one of the second data links.

3. The method according to claim 1, wherein transferring the bits of data with the known pattern comprises propagating a pseudo-random bit sequence (PRBS) pattern of a known order.

4. The method according to claim 3, wherein distributing the bits one bit at a time and in a round-robin fashion comprises iteratively transferring i) a current one of the bits to one of the plurality of second data links, and ii) a next one of the bits to a next one of the plurality of second data links, in an order in which the bits are round-robin distributed to the plurality of second data links.

5. The method according to claim 4:

the plurality of second data links comprise N data links;

a total of N×M bits are in the PRBS pattern, where M is a number of groups of bits being transferred; and distributing the bits from the first data link to each of the plurality of second data links comprises distributing bits in a first group of N bits [N−1:0] of the first data link respectively to bit0 positions of the plurality of the second data links in round-robin fashion, distributing bits in a second group of N bits [2N−1:N] of the first data link respectively to bit1 positions of the plurality of the second data links in round-robin fashion, distributing bits in a third group of N bits [3N−1:2N] of the first data link respectively to bit2 positions of the plurality of the second data links in round-robin fashion, and continuing to distribute M−3 remaining groups of N bits until bits in an Mth group of N bits [(M×N)1:(M−1)×N] of the first data link has been distributed respectively to bit(M−1) positions of the plurality of second data links in round-robin fashion.

6. The method according to claim 3, wherein transferring the bits from the plurality of second data links to the first data link comprises transferring a bit from a corresponding position in each respective link in the plurality of second data links to the first data link.

7. The method according to claim 6, wherein the plurality of second data links comprises a number of second data links that is a power of 2.

8. The method according to claim 7, wherein the known order of the PRBS pattern on each respective data link in the plurality of second data links is identical to a known order of a PRBS pattern on each other data link in the plurality of second data links.

9. The method according to claim 8, wherein, when transferring the bits from the plurality of second data links to the first data link, a number of intervals between initial seeds of the PRBS patterns on each respective data link in the plurality of second data links is a function of i) the known order of the PRBS pattern, and ii) the number of second data links in the plurality of second data links.

10. The method according to claim 6, wherein:

the plurality of second data links comprises N second data links;

the known pattern is a PRBS pattern that includes N×M bits, where M is a number of groups of bits being transferred; and transferring the bits one bit at a time and in a round-robin fashion comprises:

transferring a bit in a bit0 position of each one of the N second data links, in round-robin fashion, to the first data link to form a first group of N bits [N−1:0] on the first data link, transferring a bit in a bit1 position of each one of the N second data links, in round-robin fashion, to the first data link to form a second group of N bits [2N−1:N] on the first data link, transferring a bit in a bit2 position of each one of the N second data links, in round-robin fashion, to the first data link to form a third group of N bits [3N−1:2N] on the first data link, and continuing to transfer bits in M−3 remaining bit(M−1) positions of each one of the N second data links, in round-robin fashion, to the first data link to form an Mth group of N bits [(M×N)−1:(M−1)×N] on the first data link.

11. An apparatus for checking integrity of data propagated, in either direction, between a first data link having a first data width and a first data speed, and a plurality of second data links each of which has a second data width narrower than the first data width and a second data speed slower than the first data speed, the apparatus comprising:

data mapping circuitry configured to transfer bits of data having a known pattern (a) from the first data link to each link in the plurality of second data links, or (b) from each link in the plurality of second data links to the first data link, the transferring of the bits from the first data link to each link in the plurality of second data links comprises distributing the bits one bit at a time and in a round-robin fashion from the first data link to the plurality of second data links, and the transferring of the bits from each link in the plurality of second data links to the first data link comprises transferring the bits one bit at a time and in a round-robin fashion from the plurality of second data links to the first data link; and circuitry configured to check the integrity of the data by checking for the known pattern when receiving the data at (a) the plurality of second data links, or (b) the first data link.

12. The apparatus according to claim 11, wherein the circuitry comprises a single instance of pattern-checking circuitry for all of the apparatus.

13. The apparatus according to claim 11, wherein the circuitry comprises multiple instances of identical pattern-checking circuitry throughout the apparatus.

14. The apparatus according to claim 11, wherein, the circuitry is configured i) to check for the known pattern when receiving the bits of data at the plurality of second data links, and ii) to check for the known pattern on a portion of one of the plurality of second data links between a first device and a second device, the first device being connected between the first data link and the second data link.

15. The apparatus according to claim 11, wherein the bits have a pseudo-random bit sequence (PRBS) pattern of a known order.

16. The apparatus according to claim 11, wherein the data mapping circuitry configured, when distributing the bits one bit at a time and in a round-robin fashion, to iteratively transfer i) a current one of the bits to one of the plurality of second data links, and ii) a next one of the bit to a next one of the plurality of second data links, in an order in which the bits are round-robin distributed to the plurality of second data links.

17. The apparatus according to claim 15, wherein:
the plurality of second data links comprise N data links;

a total of N×M bits are in the PRBS pattern, where M is a number of groups of bits being transferred; and the data mapping circuitry is configured, when distributing the bits from the first data link to each of the plurality of second data links, to distribute bits in a first group of N bits [N−1:0] of the first data link respectively to bit0 positions of the plurality of the second data links in round-robin fashion;

distribute bits in a second group of N bits [2N−1:N] of the first data link to respectively bit1 positions of the plurality of the second data links in round-robin fashion;

distribute bits in a third group of N bits [3N−1:2N] of the first data link respectively to bit2 positions of the plurality of the second data links in round-robin fashion; and continue to distribute M−3 remaining groups of N bits until each bit in an Mth group of N bits [(M×N)1:(M−1)×N] of the first data link has been distributed respectively to bit(M−1) positions of the plurality of the second data links in round-robin fashion.

18. The apparatus according to claim 15, wherein the data mapping circuitry is configured, when transferring the bits from the plurality of second data links to the first data link, to transfer a bit from a corresponding position in each respective link in the plurality of second data links to the first data link.

19. The apparatus according to claim 18, wherein the plurality of second data links comprises a number of second data links that is a power of 2.

20. The apparatus according to claim 19, wherein the known order of the PRBS pattern is identical to a known order of a PRBS pattern propagated on each other data link in the plurality of second data links.

21. The apparatus according to claim 20, wherein the circuitry is configured, when transferring the bits from the plurality of second data links to the first data link, is distribute the bits such that a number of intervals between initial seeds of the PRBS patterns on each respective data link in the plurality of second data links is a function of i) the known order of the PRBS pattern, and ii) the number of second data links in the plurality of second data links.

22. The apparatus according to claim 18, wherein:
the plurality of second data links comprises N data links;
the known pattern is a PRBS pattern that includes a total of N×M bits, where M is a number of groups of bits being transferred; and the data mapping circuitry is configured, when transferring the bits from the plurality of second data links to the first data link, to coalesce a bit in a bit0 position of each one of the N second data links, in round-robin fashion, to the first data link to form a first group of N bits [N−1:0] on the first data link, coalesce a bit in a bit1 position of each one of the N second data links, in round-robin fashion, to the first data link to form a second group of N bits [2N−1:N] on the first data link, coalesce a bit in a bit2 position of each one of the N second data links, in round-robin fashion, to the first data link to form a third group of N bits [3N−1:2N] on the first data link, and continue to coalesce bits in M−3 remaining bit(M−1) positions of each one of the N second data links, in round-robin fashion, to the first data link to form an Mth group of N bits [(M×N)1:(M−1)×N] on the first data link.

* * * * *